UNITED STATES PATENT OFFICE.

EDWIN B. THORNHILL, OF HURLEY, NEW MEXICO.

TREATMENT OF ORES CONTAINING OXIDES OF COPPER.

1,407,045.   Specification of Letters Patent.   Patented Feb. 21, 1922.

No Drawing.   Application filed July 2, 1921.   Serial No. 482,256.

*To all whom it may concern:*

Be it known that I, EDWIN B. THORNHILL, a citizen of the United States, residing at Hurley, in the county of Grant and State of New Mexico, have invented certain new and useful Improvements in the Treatment of Ores Containing Oxides of Copper, of which the following is a specification.

The object of my invention is the treatment of ores containing oxides of copper, in such manner as to precipitate the metal from a solution in the gangue and pulp in a more efficient manner than heretofore, and in such manner as to render the subsequent separation of the metal from the gangue by flotation more easy, economical and efficient.

In the practice of my invention, I grind or crush the ore, form a pulp thereof with water, and add to the pulp a solvent, such as sulphuric acid, to dissolve the copper oxide. To the pulp containing the copper in solution I add sponge-iron obtained by subjecting oxide of iron crushed to the desired fineness to a reducing treatment, such, for example, as described in my copending application Serial No. 438,957, filed January 21, 1921. This sponge-iron which is in either a finely-divided or friable condition is added to the pulp without crushing, grinding, or other compacting operation, subsequent to its reduction. This addition to the mixture results in the precipitation in the gangue and pulp of copper in the form of a flocculent precipitate, which is recovered by flotation, an operation which is so well known as to require no description herein.

After the oxide of iron has been reduced to the condition of sponge-iron the latter is preferably separated from the foreign matter present—such as excess reducing agent, silica and alumina—by magnetic separation in the well-known manner.

Heretofore endeavors have been made to utilize sponge-iron for a similar purpose, but such sponge-iron has been crushed, ground, or subjected to other treatment before being used as a precipitant, which injuriously affected the porosity thereof, so that the copper was not precipitated in the form which is susceptible to easy recovery by flotation, and in many instances the iron became only coated with the copper and failed to respond to flotation.

The terms "oxides of copper" and "copper oxide" and "metallic oxides", in the specification and claim include all oxidation products of copper or copper-bearing minerals, such as oxides, carbonates and silicates, which are soluble in simple acids, such as sulphuric acid.

Claim—

A process of the class described consisting in subjecting copper ore or the like to the action of a solvent such as sulphuric acid to dissolve the metallic oxides, adding to the mixture sponge-iron obtained by reducing iron oxide unmodified by mechanical treatment involving abrasion or comminution after reduction of the oxides, thereby precipitating the metal as a flocculent precipitate and recovering the precipitated metal by flotation.

In testimony whereof, I have subscribed my name.

EDWIN B. THORNHILL.